United States Patent
Wyne

(10) Patent No.: US 10,149,433 B2
(45) Date of Patent: Dec. 11, 2018

(54) COMBINATION BLADE AND CORD WEED CUTTER-TRIMMER HEAD DEVICE

(71) Applicant: Mark W Wyne, Wildwood, MO (US)

(72) Inventor: Mark W Wyne, Wildwood, MO (US)

(73) Assignee: Combined Manufacturing Inc., Wildwood, MO (US)

( * ) Notice: Subject to any disclaimer, the term of this patent is extended or adjusted under 35 U.S.C. 154(b) by 0 days.

(21) Appl. No.: 14/999,730

(22) Filed: Jun. 20, 2016

(65) Prior Publication Data

US 2017/0006775 A1 Jan. 12, 2017

Related U.S. Application Data

(60) Provisional application No. 62/231,591, filed on Jul. 10, 2015.

(51) Int. Cl.
| | | |
|---|---|---|
| *A01D 34/685* | (2006.01) | |
| *A01D 34/73* | (2006.01) | |
| *A01D 34/416* | (2006.01) | |

(52) U.S. Cl.
CPC ....... *A01D 34/685* (2013.01); *A01D 34/4161* (2013.01); *A01D 34/4166* (2013.01); *A01D 34/733* (2013.01)

(58) Field of Classification Search
CPC .. A01D 34/416; A01D 34/685; A01D 34/835; A01D 34/73; A01D 34/733; A01D 34/4161; A01D 34/4166; B27B 19/008
USPC .......................... 30/276; D8/7, 8; D15/16, 17
See application file for complete search history.

(56) References Cited

U.S. PATENT DOCUMENTS

| | | | | |
|---|---|---|---|---|
| 2,660,847 A | * | 12/1953 | Britten | A01D 34/84 403/256 |
| 3,625,292 A | * | 12/1971 | Lay | A01G 3/062 56/256 |
| 3,706,363 A | * | 12/1972 | Niles | A01D 69/08 192/3.54 |
| 3,756,325 A | * | 9/1973 | Rucinski | F16D 7/025 192/70.11 |

(Continued)

*Primary Examiner* — Jason Daniel Prone
(74) *Attorney, Agent, or Firm* — Paul M. Denk

(57) ABSTRACT

A combination blade and cord weed cutter-trimmer head apparatus that incorporates a mounting head, having a base plate, that mounts an electric or gas motor, its motor shaft extending downwardly, and through an adapter connects with generally through the cutter blade, with the shaft extending further downwardly for connecting with the string trimmer head of the device. Thus, the device can cut thicker weeds and brush through the application of its cutter blade, and can cut the shortened weeds down to an acceptable level through the usage of the string trimmer. Slip clutches may be incorporated within the device, to allow the motor shaft to continue rotating, in the event that the cutter blade encounters an unmovable obstacle, that prevents its rotation. In a further embodiment, the lines of the string trimmer may extend radially outwardly from the cutter blades, through integral channels provided therein, to provide simultaneous cutting at the same level by both the cutter blade, and the string trimmer, during usage. In a further embodiment, the string trimmer head may locate above the cutter blade both securing onto the motor shaft and held by the adapter to provide for cutting of both weeds and brush during usage.

3 Claims, 5 Drawing Sheets

(56) References Cited

U.S. PATENT DOCUMENTS

| | | | | |
|---|---|---|---|---|
| 3,802,222 A | * | 4/1974 | Weber | A01G 3/053 30/216 |
| 3,859,776 A | | 1/1975 | Ballas et al. | |
| 3,933,059 A | * | 1/1976 | Houck | E21B 3/02 254/358 |
| 3,959,879 A | * | 6/1976 | Sellers | A01D 34/84 30/276 |
| 4,035,912 A | | 7/1977 | Ballas et al. | |
| 4,052,789 A | | 10/1977 | Ballas, Sr. | |
| 4,067,108 A | | 1/1978 | Ballas | |
| 4,097,991 A | | 7/1978 | Proulx | |
| 4,124,938 A | | 11/1978 | Ballas, Sr. | |
| 4,136,446 A | | 1/1979 | Tripp | |
| 4,145,809 A | | 3/1979 | Proulx | |
| 4,156,312 A | | 5/1979 | Ballas, Sr. | |
| 4,167,812 A | | 9/1979 | Moore | |
| 4,168,572 A | | 9/1979 | Ewing | |
| 4,183,138 A | | 1/1980 | Mitchell et al. | |
| 4,203,212 A | | 5/1980 | Proulx | |
| 4,259,782 A | | 4/1981 | Proulx | |
| 4,292,791 A | * | 10/1981 | Lalonde | A01D 34/005 56/255 |
| 4,367,587 A | * | 1/1983 | Kilmer | A01D 34/416 30/276 |
| 4,790,071 A | * | 12/1988 | Helmig | A01D 34/4166 30/276 |
| D299,484 S | * | 1/1989 | Lee | D8/8 |
| D301,110 S | * | 5/1989 | Barbula | D8/7 |
| 4,856,194 A | * | 8/1989 | Lee | A01D 34/736 30/276 |
| 4,860,451 A | * | 8/1989 | Pilatowicz | A01D 34/902 30/276 |
| 4,862,682 A | | 9/1989 | Wait et al. | |
| D311,009 S | * | 10/1990 | Wilkins | D15/17 |
| 5,027,591 A | * | 7/1991 | Nakamura | A01D 34/30 30/276 |
| 5,430,943 A | * | 7/1995 | Lee | A01D 34/4168 30/276 |
| 5,588,496 A | * | 12/1996 | Elger | B25B 23/1405 192/56.1 |
| 5,651,418 A | * | 7/1997 | Jerez | A01B 1/06 172/14 |
| 5,862,598 A | * | 1/1999 | Lee | A01D 34/4168 30/276 |
| 6,014,812 A | * | 1/2000 | Webster | A01D 34/4163 30/276 |
| 6,298,642 B1 | * | 10/2001 | Harb | A01D 34/416 30/276 |
| 6,349,475 B1 | * | 2/2002 | Buck | A01D 34/001 30/122 |
| 6,470,658 B1 | * | 10/2002 | Wubbels | A01D 69/08 56/11.7 |
| 6,699,130 B2 | * | 3/2004 | Wubbels | A01D 69/08 192/113.31 |
| 6,722,040 B2 | | 4/2004 | Sullivan | |
| 6,735,874 B2 | | 5/2004 | Iacona | |
| 6,902,485 B2 | * | 6/2005 | Wubbels | A01D 69/08 464/17 |
| D577,372 S | * | 9/2008 | Hung | D15/17 |
| 7,861,797 B2 | * | 1/2011 | Hartmann | B25B 21/02 173/104 |
| 8,307,559 B2 | | 11/2012 | Tomita | |
| 8,769,831 B2 | * | 7/2014 | Duvall | A01D 34/4166 30/122 |
| 9,078,394 B2 | * | 7/2015 | Harless | A01D 34/416 |
| D743,448 S | * | 11/2015 | Nelson | D15/17 |
| 9,363,946 B2 | * | 6/2016 | Pellenc | A01D 34/416 |
| 9,803,699 B2 | * | 10/2017 | Sturgin | F16D 7/027 |
| 2004/0173362 A1 | * | 9/2004 | Waithman | E21B 34/066 166/386 |
| 2005/0133330 A1 | * | 6/2005 | Stiefvater | F16D 7/044 192/55.1 |
| 2009/0008115 A1 | * | 1/2009 | Guo | B25D 16/003 173/176 |
| 2010/0025131 A1 | * | 2/2010 | Gloceri | B60G 3/20 180/65.28 |
| 2011/0203119 A1 | * | 8/2011 | Rosskamp | A01G 3/053 30/277.4 |
| 2015/0359172 A1 | * | 12/2015 | Nelson | A01D 34/733 30/276 |

* cited by examiner

US 10,149,433 B2

COMBINATION BLADE AND CORD WEED CUTTER-TRIMMER HEAD DEVICE

CROSS REFERENCE TO RELATED APPLICATION

This non-provisional patent application claims priority to the provisional patent application having Ser. No. 62/231,591, filed on Jul. 10, 2015.

FIELD OF THE INVENTION

This invention is a combination of a string trimmer, incorporating a solid blade head, with the combination operating off of gas or electric, and incorporates a string trimmer head of any available design, such as the bump and feed, automatic, manual feed, or fixed string, that further includes a metal blade thereabove, so that the blade can cut the thicker weeds or brush encountered, and to facilitate and make it easier for the cord trimmer to cut the remaining thinner weeds, during operations of the device.

BACKGROUND OF THE INVENTION

Weed and brush cutting devices have been around for some time. The weed whip, or weed cutter, has been available since its invention during the 1970s'. In addition, the rotary lawn mower, with its circular blade, has been available many years prior thereto. While there have been many innovations made to these two lawn care devices, combining the two to obtain some of their benefits in combination, has not been very prevalent.

The patent to Duvall, U.S. Pat. No. 8,769,831, does show a combination string and blade trimmer head. In this particular instance, blades are applied into select recessed sections of the device, in order to function as a plurality of trimmer blades, and a trimmer head incorporates a series of monofilament lines, that may also function in the trimming mode. It is a two-mode convertible trimmer, and apparently operates in two different modes, during its usage. The current invention has different structure for achieving the simultaneous usage of its cutter and line trimmer during application.

The patent to Tomita, U.S. Pat. No. 8,307,559, shows another bush cutter blade and bush cutter. This device incorporates a plate, that has secured to it a series of metal blades, for rotation, to furnish a bush cutter, and it also incorporates internally thereof a string blade, that extends its string cutter outwardly in combination with the blade, to attain a cutting action during the cutter's rotation. The concept of the current invention is to structurally orient the cutter blade upwardly within its assembly, and apply the monofilament line trimmer therebelow, so that the cutter blade may cut the tall weeds or brush, thereby facilitating the chore of the line trimmer to cut shorter weeds or grass during its usage, since it is arranged below the cutter blades. Although, in a modified embodiment, the cutter blade may be provided above or below the line trimmer assembly, within the structure of the blade cutter-trimmer head device.

There are a variety of additional patents that have issued on various types of weed cutting devices, such as U.S. Pat. No. 6,722,040, the rotary grass trimming device of U.S. Pat. No. 4,862,682, and the various patents to Weed Eater, Inc., such as U.S. Pat. No. 4,067,108, U.S. Pat. No. 4,052,789, U.S. Pat. No. 4,136,446, U.S. Pat. No. 4,156,312, U.S. Pat. No. 3,859,776, U.S. Pat. No. 4,035,912, and U.S. Pat. No. 4,124,938, amongst others. In addition, other United States patents show rotary cutting devices, such as U.S. Pat. No. 4,097,991, U.S. Pat. No. 4,259,782, U.S. Pat. No. 4,145,809, and U.S. Pat. No. 4,203,212.

The concept of providing an automatic feed for the cutting line of an apparatus for cutting vegetation can be seen in U.S. Pat. No. 4,183,138, in addition to U.S. Pat. No. 4,168,572, and U.S. Pat. No. 4,167,812. These are examples of further modifications to weed cutting devices, that have been published previously.

SUMMARY OF THE INVENTION

This invention contemplates changes to the structure of a weed trimming device, and more specifically to the structural orientation of both a weed trimming line for functioning as a weed cutter, and incorporating a blade structure thereabove, or even in alignment with the line trimmer, so that taller weeds or brush can be cut by the bladed cutter, thereby reducing the height of the weeds to be trimmed by the line trimmer, during its functioning. Hence, this device not only cuts the taller weeds through the use of its blades, that are generally arranged above the line trimmer, and thereby provides for the simultaneous trimming of the lower weeds, which facilitates their cutting and places less pressure upon the apparatus during its usage.

The concept of this invention is to provide a combination of string trimmer and solid blade head that can be used upon any gas or electric string trimmer, and blade cutter assembly. This device incorporates a string trimmer head of the type of designs that may be available in the art, whether it be of the automatic, bump and feed type, manual feed type, or fixed string, and is used in combination generally with a multi blade cutter, generally formed of high strength metal, plastic, or composite blades. Generally, the solid blade will be incorporated above the string trimmer, to achieve the results as previously summarized, and that is to allow the blades to simultaneously cut the taller weeds, leaving the shorter length of weeds for the string trimmer to cut in a more facile manner. Thus, it places less of a structural burden upon the line trimmer to cut these shorter weeds, during usage and operation of this device.

In a further embodiment, the cutting blades themselves, which may be formed as a solitary unit, can integrate radial channels that extend the trimmer lines outwardly, the channels being formed through the central portion of the integral blades, so that a combination blade cutting, and line trimming, can take place simultaneously at a unitary level, during usage of this device.

The structural relationship of the components of this device includes a mounting head, having a base plate, incorporating the motor thereon, a motor shaft extends through the plate and secures a cutting blade in place, and then the motor shaft, through its adapter, secures with the string trimmer head that incorporates the various elements that radially extend the trim line, usually of a monofilament type, radially outwardly, to extend the trim line radially so that both line trimming and blade cutting can occur, simultaneously, through usage of this device. The string trimmer head may be one of the bump type, or automatic, that can feed line radially outwardly as it is needed, during its application and usage. The cutter blade may be secured by one or more slip clutch members, so that should the blade encounter an unmovable obstacle, such as a fence, rock, or other impediment to cutting, the blade will slip upon its shaft, through the use of these clutches, so as not to burn out the motor of the device, during such usage.

In an alternate embodiment, the blade may similarly be secured by slip clutch to the adapter of the motor shaft, and generally surround the string trimmer head in its positioning. The blades, or each one of them, all integrally formed, may have channels extending radially through their blades, and allow the extended line, from the trimmer head, to pass through the blade channels, so as to orient the weed trimming lines in alignment with the cutter blades, to provide for that simultaneous both blade cutting of the taller weeds, and cutting the remnant weeds through the use of the trimmer line, during usage and operations of the device. Once again, the blade may be secured in position relative to the trim cutter head, and the adapter of the motor shaft, through the use of one or more slip clutches, so that should the cutter blades encounter an obstacle, that prevents rotation of the cutter blade, the clutches will allow the blade to slip, so that excessive strain is not placed upon the motor and its shaft, that could otherwise lead to burnout of the motor, during such irregular usage.

These are examples of the structure of the device, in summary, which generally, in the primary embodiment, is to provide a cutter blade that can cut those taller weeds, to allow the string line to cut the shorter weeds, and lessen the force needed by the trimmer line to function as a weed cutter, during usage of the apparatus.

It is, therefore, the principal object of this invention to provide for a combination of a cutter blade, and a weed trimmer line, to furnish multiple cutting of a height of weeds during its usage.

Another object of this invention is to provide for the sequential, but simultaneous, cutting of taller weeds, with the taller portion of the weeds being cut by the cutter blades, while the remaining shorter weeds are severed by the monofilament line of the string trimmer head, during usage of the device.

Yet another object of this invention is to provide a weed cutting assembly, incorporating a string trimmer means, that saves on the nylon string by using its integrated fixed blades to cut larger woody growth or heavy vegetation, such as taller and thick weeds, thereby lessening the effect of continually breaking the trimmer line, during its usage.

Another object of this invention is to take the pressure off of the string trimmer line for a weed cutting device so that it only is used to cut the remaining shorter weeds, during a lawn trimming operation.

Still another object of this invention is to provide for a multi variety of cutting of weeds and brush, or other heavy growth, with the use of one weed cutting device.

Another object of this invention is to provide an apparatus for cutting heavy weeds and woody growth, that can be used for trimming along a chain-link fence, rock wall, trees, planters, through the use of the cutting blade, and then cut into the remaining light weedy growth, without having to change the cutting heads of the apparatus.

Another object of this invention is to incorporate slip clutch(es) into a weed cutting device that allows for slippage of its integral cutting blade, should it be retarded in its rotation, without having any effect upon the string trimmer head, or the motor to which it mounts.

These and other objects may become more apparent to those skilled in the art upon review of the summary of the invention as provide herein, and upon undertaking a study of the description of its preferred embodiments, in view of the drawings.

DESCRIPTION OF THE PREFERRED EMBODIMENT

Figure 1:
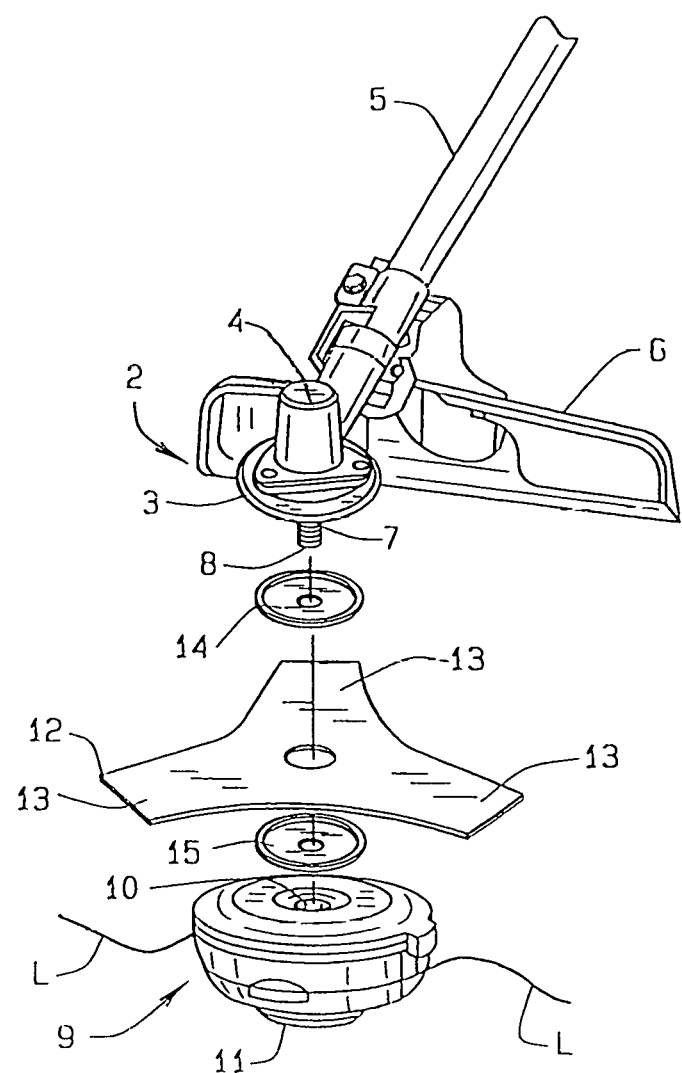
FIG. 1 is an exploded view of the combination blade and cord weed cutter-trimmer head of this invention.

In referring to the drawings, an in particular FIG. 1, therein is shown the combination blade and cord weed cutter-trimmer head of this invention. The entire assembled invention can be seen at 1 in FIG. 3. As noted, the device includes a mounting head 2 that includes a base plate 3 that supports and holds the motor 4 to the assembly. The motor may be either an electric energized motor, or a gas operating motor. Generally, there is a handle 5 that extends upwardly from the mounting head, and a handle normally will have applied thereto a shield 6 as can be noted. The motor includes a downwardly extending shaft 7 which may have a multiple threaded adapter 8 applied to it. The motor shaft is long enough to extend downwardly for connecting or otherwise threadedly engaging with the string trimmer head 9 usually by threadedly engaging within its central opening 10. Thus, when the motor runs, the string trimmer head 10 will likewise rapidly rotate, as known in the art. The string trimmer head may be of the bump style, automatic, manual, fixed string type, as also known in the art. The bump style normally includes a downwardly extending glide ball 11 which normally, when bumped, can feed additional line L radially outwardly, for use for line trimming purposes.

Figure 3:
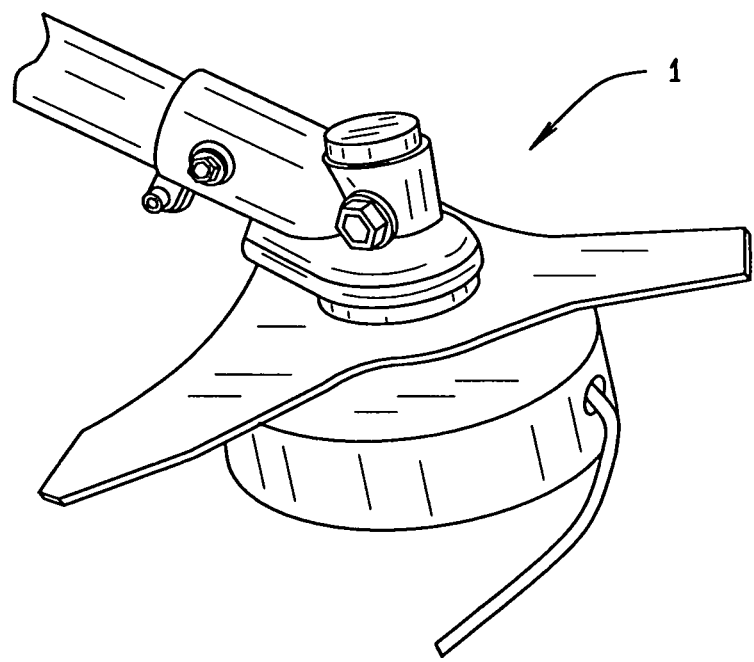
FIG. 3 provides an isometric view of the cutter-trimmer of FIG. 1.

Also mounted upon the motor shaft, and its adapter, is the integral blade 12 which in this particular instance, includes 3 integrally formed blades 13 extending radially outwardly from its mounting to the motor shaft, and which blade includes the usual cutting edges, upon the frontal edge of its rotating blade, and in this particular instance, for simultaneously cutting heavier and taller weeds and brush, through usage of this apparatus. Thus, as previously summarized, since the blade 12 is located upwardly from the string trimmer head 9, the blade will cut the taller weeds and brush, while at the same time the string trimmer 9 will cut the shortened weeds, down to an acceptable level. Obviously, when a cutter blade of this type, as noted at 12, is used in its cutting function, it may encounter unmovable obstacles, such as a fence, fence post, concrete walk, rocks, or any other obstacle that instantly blocks its rotation. When this occurs, the cutter blade must be released from its normally rigid mounting upon the motor shaft or its adapter 8, so that while the motor may continue rotating, as will its attached string trimmer head 9, the blade may be stopped from rotation as a result of the obstacle it has encountered. To achieve such, one or more slip clutches 14 and 15 are mounted intermediate the blade 12 and its connection through the adapter 8, and in addition, the slip clutch 15 releases the blade from its connection with the upper surface of the string trimmer head 9, so that while the blade becomes instantly fixed, the motor and its shaft will continue in its rotation, as will the string trimmer head 9, through the operations of the one or more slip clutches 14 and 15, in their connection with the cutter blade 12 within the assembly. In any event, the assembled structure as shown and defined herein in FIGS. 1 and 3, show the string trimmer head being mounted to its motor shaft, but having this cutter blade 12 located intermediate the motor and the string trimmer head, in order to provide for cutting by the blades 13 of the heavier vegetation, as reviewed, during the usage and operation of this apparatus.

Figure 2:
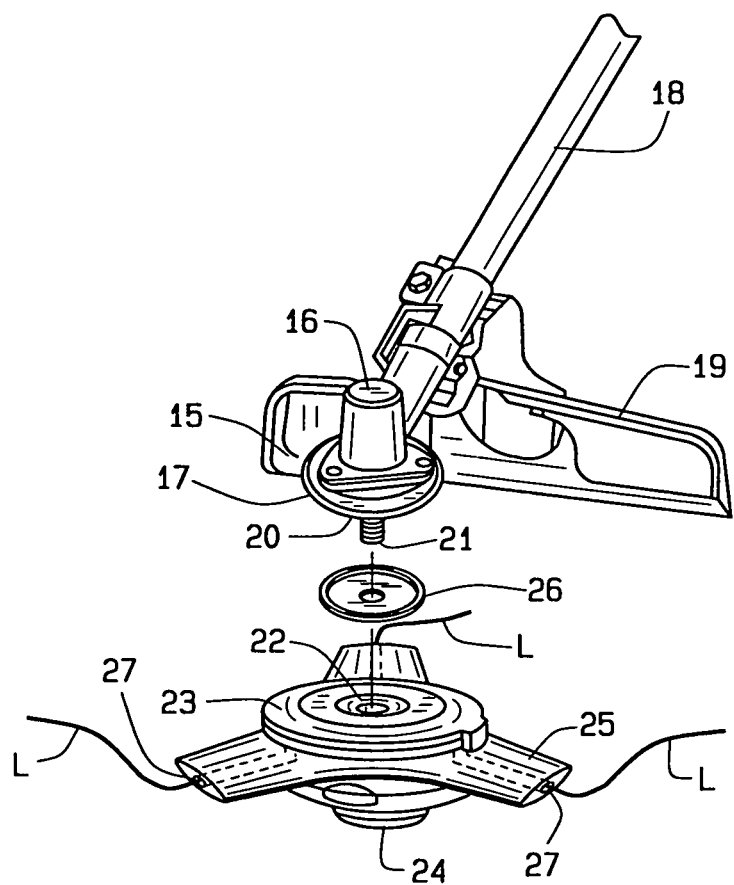
FIG. 2 provides an exploded view of a modification to the combination blade and cord weed cutter-trimmer head of this invention.

FIG. 2 shows a variation upon the structure of the assembly of this cutter-trimmer device. As can be seen, it still includes its mounting head 15, that supports the motor 16, upon its base plate 17 as noted. It further includes its connected upwardly extending handle 18 that includes the guard 19 in its structure. In this particular instance, the motor shaft 20 and its adapter 21 secure within the aperture 22 of the string trimmer head 23. Once again, the string trimmer head may be of any one of the bump and feed type, automatic type, manual feed or fixed string type of line trimmer. It further includes its lower glide ball 24, when this string trimmer functions as the bump and feed type, as known in the art. In this particular instance, the string trimmer head secures to the motor shaft, as previously described, but in this instance, the cutting blade 25 is integrated into the structure of the string trimmer head 23, so that when an unmovable obstacle is encountered by the blade 25, the slip clutch 26 will allow the entire string trimmer head assembly 23, and its blade 25, to become uneventfully fixed, due to its encountering of a rock, etc., and this is achieved through the usage of the slip clutch 26 that secures onto the motor shaft, or its adapter 21, intermediate the connection of its mounting head 15, and the string trimmer head 23. Thus, when the entire head 23 encounters an object, that prevents the rotation of its blade 25, the slip clutch will allow the motor shaft to continue its rotation, so that there is no burnout of the motor, during such unauthorized blockage of the cutter.

As can be noted, in this particular instance, where the cutter blade 25 is integrated into the structure of the string trimmer head 23, the trimming line L extends radially outwardly from the outer tips of the blades 25, extending through integral apertures 27, as can be noted. Thus, through this type of structure, the blades 25 will cut the larger weeds simultaneously with the cutting achieved by the radially extending lines L, that extend outwardly on the same level as the cutting blades 25, as can be noted. Thus, this provides for simultaneous cutting by the cutter blades, in addition to the trimmer lines, during the usage and functioning of this particular cutter-trimmer apparatus.

Figure 4:
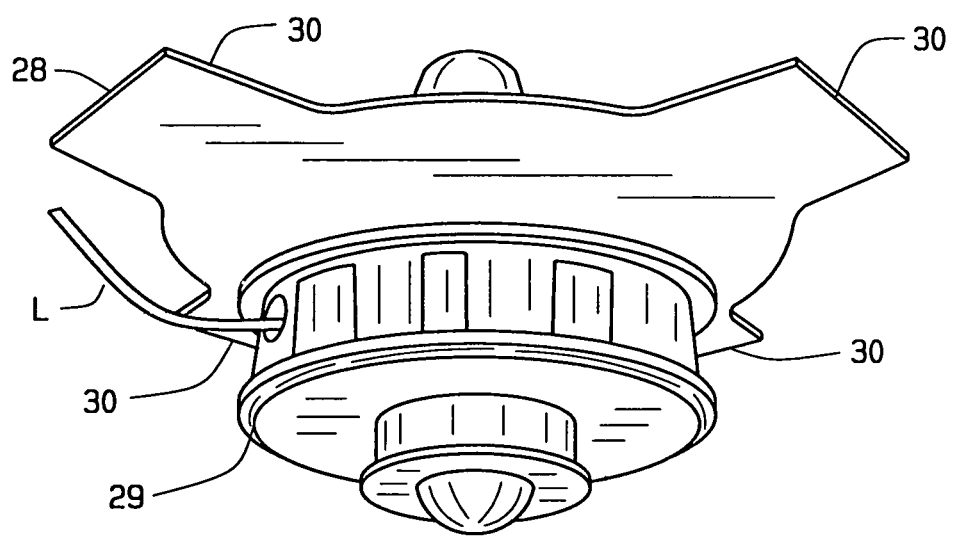
FIG. 4 is a perspective view of a further modification to the cutter-trimmer of the embodiment as shown in FIG. 1.

FIG. 4 provides a slight modification to the structure of the cutter-trimmer assembly, and in this particular instance, as can be noted, the trimmer blade 28 is arranged upwardly of the string trimmer head 29, and therefore, can cut the taller weeds or brush during its functioning, while the trimmer line L can cut the short weeds down to the desired level. As noted, the cutter blade, in this instance, may comprise an integral four bladed cutter 30. In addition, the line trimmer 29 is arranged below the cutting blade 28, to achieve that dual cutting, simultaneously, during usage of this lawn care apparatus.

Figure 5:
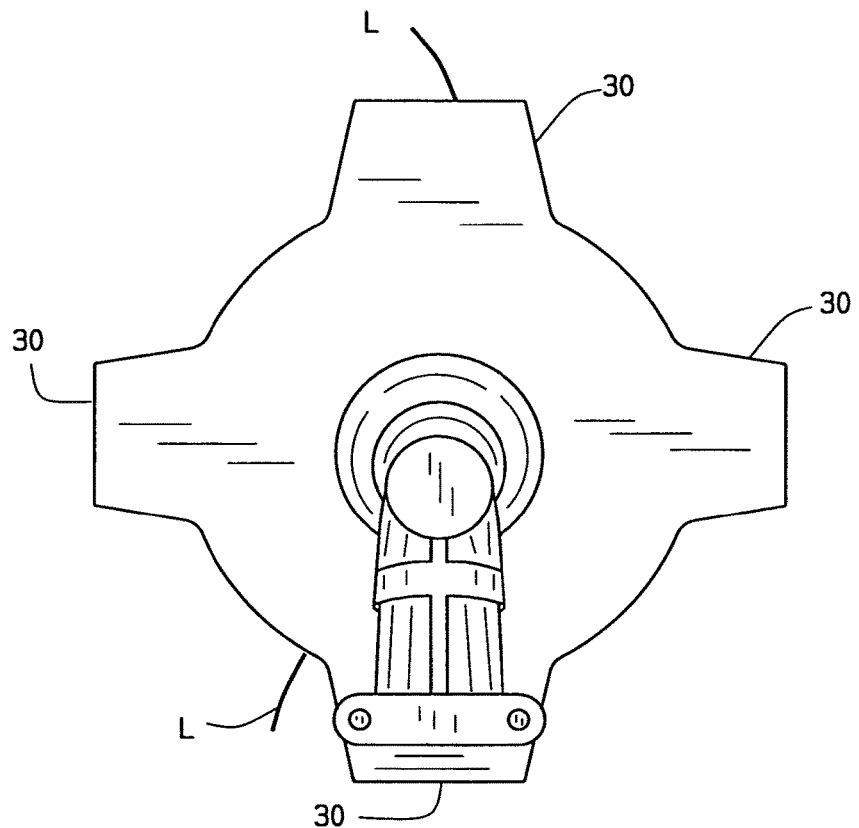
FIG. 5 is a top view of the cutter-trimmer of FIG. 4.

FIG. 5 provides a top view of the cutter-trimmer of FIG. 4. Its four integral blades 30 are clearly shown, and the lines L of the trimmer head 29 can also be seen arranged below said blades.

Figure 6:
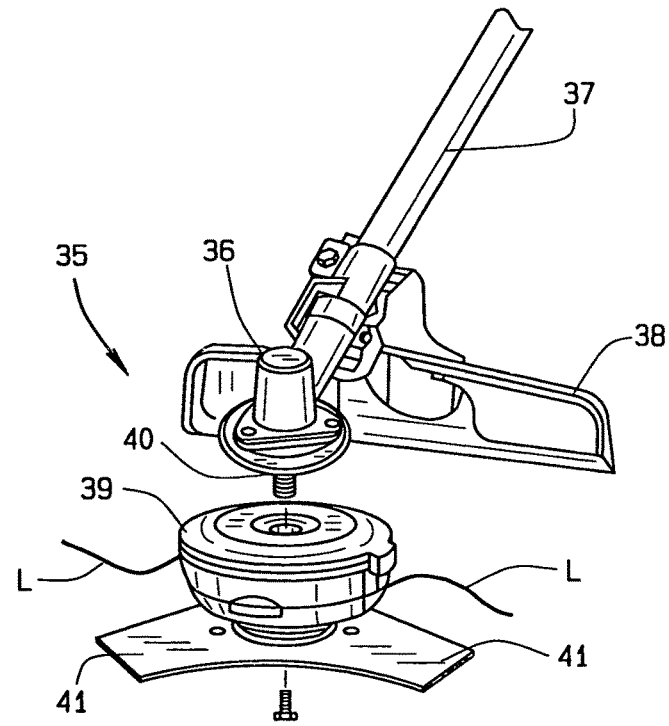
FIG. 6 shows an exploded view of a gas or electric trimmer, where the string trimmer is located above the metal blade that is used for cutting brush, etc.

FIG. 6 provides an exploded view of the variation upon the combination blade and cord weed cutter-trimmer head device of this invention. As noted, the device 35 includes its mounting head 36, secured with the handle 37 and securing its shield 38, as can be noted. In this particular instance, the string trimmer head 39 is first secured to the extending shaft 40 and therefor feeds out its line L for the trimming of any grass, weeds, or the like. But, below the head 39 is the blade 41, usually incorporating 3 or 4 blades, or less, and is secured with the trimmer head to provide for simultaneous rotation, and the initial cutting of any brush, small limbs, or the like, that may be present during usage of this device.

Figure 7:
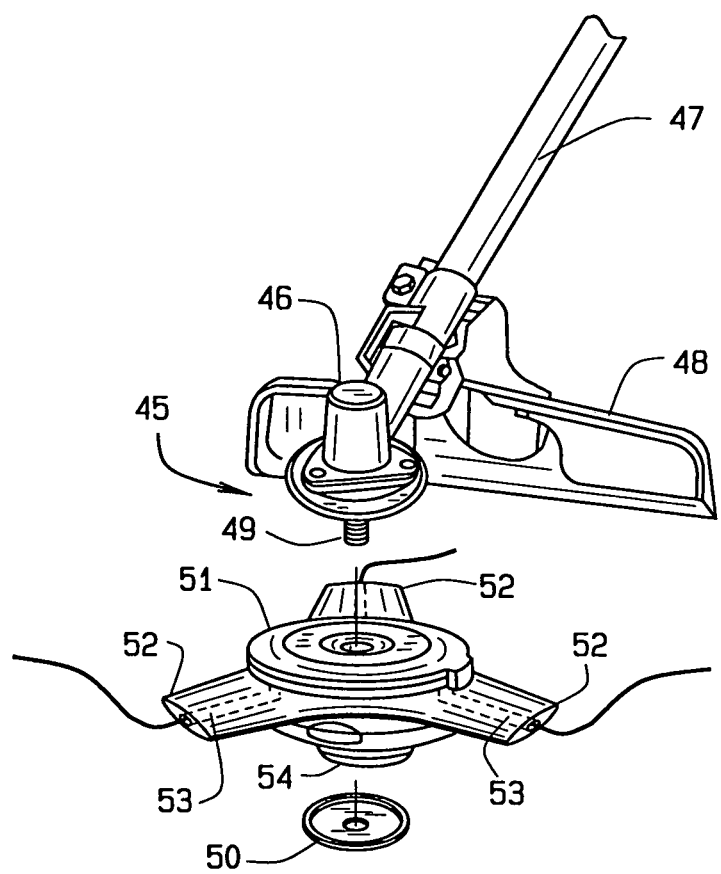
FIG. 7 shows a variation upon the design where the string trimmer feeds it line through the blades of the brush cutter, and therefor both function simultaneously upon the same plane during operation, and having the slip clutch installed below the cutter.

FIG. 7 shows a further variation upon the concept of the invention, that includes the mounting head 45 secured with its electric or gas motor 46 that is affixed with the handle 47, that further supports its shield 48, as can be seen. Extending downwardly from the motor is its shaft 49, for mounting of the trimmer head 51, as can be noted. The uniqueness of this design is that the sharpened blades 52 are integrally formed with the trimmer head 51, as noted. And, while the blades are sharpened upon their edges, they provide a conduit, in each blade, as at 53, and then the glide ball or bumper 54 connects onto the bottom of the device, to allow for feed out of the line when it is bumped against a surface. It may be the slip clutch 50 could be located at the location of the glide ball 54, or just above it, during its assembly, to allow for slippage of the blade in the event that it encounters excessive brush that may prevent its turning, or causes its binding. This type of slip clutch may be applied to all of the various devices as defined in this invention.

Variations or modifications to the subject matter of this invention may occur to those skilled in the art upon review of the description of the invention as provided herein. Any such variations, if within the spirit of this invention, are intended to be encompassed within the scope of the claims to patent protecting issuing hereon. The specific description of the invention in the specification, and their depiction in the drawings, are set forth for illustrative purposes only.

I claim:

1. A trimmer comprising:
   a handle having a first end and a grip end to be gripped by an operator;
   a mounting head connected to the first end of the handle, the mounting head further comprising a base plate, a motor on the base plate, the motor having a rotatable shaft extending through the base plate;
   a cutting blade provided on the shaft;
   a first slip clutch provided on the shaft and engaging a surface of the base plate and a first surface of the cutting blade;
   a second slip clutch provided on the shaft and engaging a second surface of the blade opposite the first surface of the blade;
   a trimmer head secured to an end of the shaft, the trimmer head having a line cutter, the second slip clutch engaging a surface of the trimmer head;
   wherein rotation of the shaft via the motor results in rotation of the cutting blade and the trimmer head; and
   when the shaft is rotating via the motor and the cutting blade is in a position where the cutting blade is unable to rotate, the shaft and the trimmer head will continue to rotate via the slip clutches.

2. The combination blade and cord weed cutter-trimmer device of claim 1, wherein said blade is formed of metal.

3. The combination blade and cord weed cutter-trimmer device of claim 1, wherein said blade is formed of polymer.

* * * * *